Patented July 8, 1952

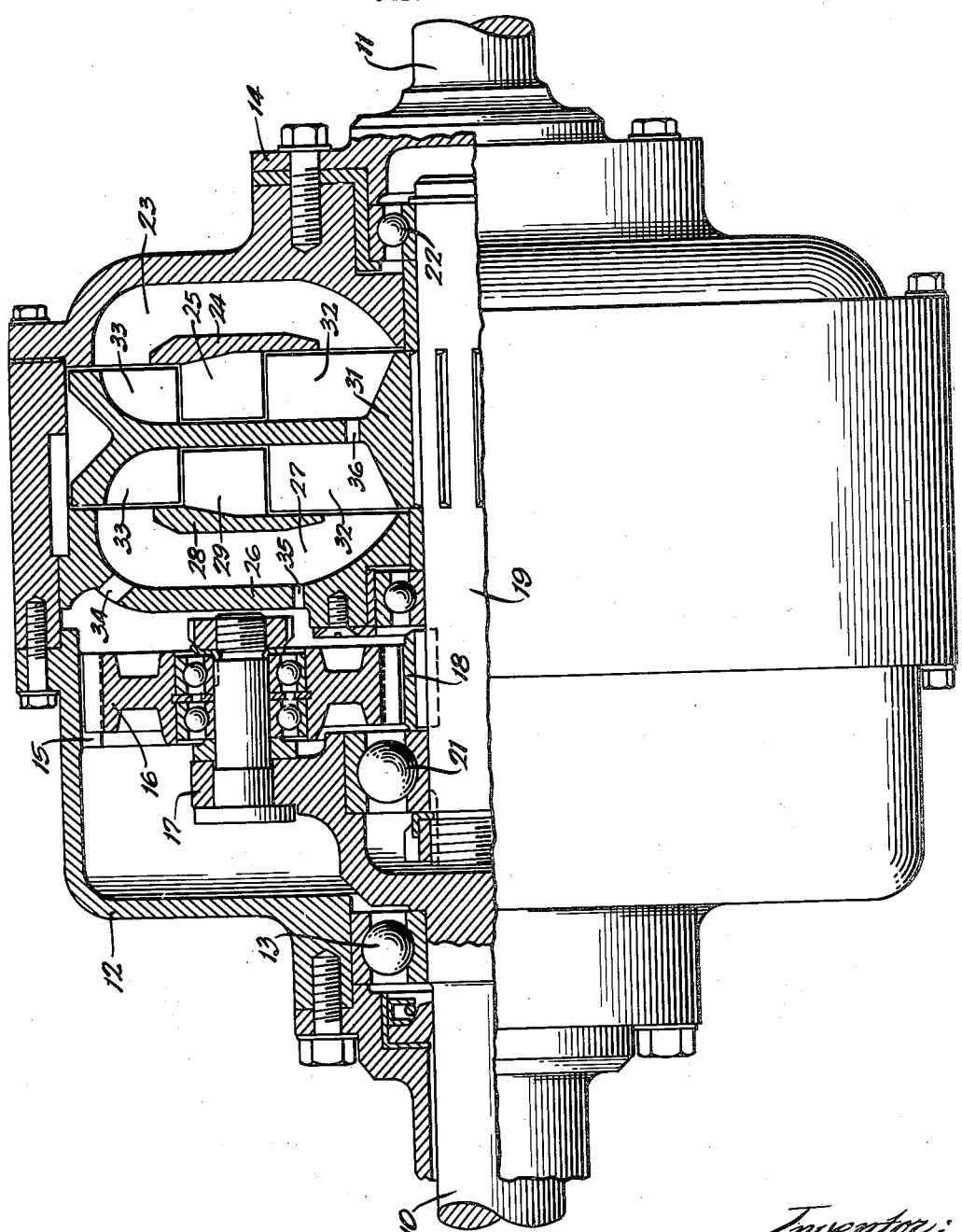

2,602,295

UNITED STATES PATENT OFFICE 2,602,295

ROTARY HYDRAULIC COUPLING

Rexford Olan Anderson, Chicago, Ill., assignor to Foote Bros. Gear & Machine Corporation, Chicago, Ill., a corporation of Delaware Application October 11, 1946, Serial No. 702,605

2 Claims. (Cl. 60—54)

This invention relates to hydraulic couplings and particularly to differential torque transmitting couplings of the hydraulic kinetic type.

One of the objects of the invention is to provide a hydraulic coupling including a hydraulic torque transmitting unit in which the overall torque capacity exceeds that of the torque transmitting unit and the overall efficiency of the coupling exceeds that of the unit.

Another object is to provide a hydraulic coupling in which a differential gear set and a hydraulic torque transmitting unit are so connected that the gear set functions to increase the relative rotation between the cooperating members of the unit.

Still another object is to provide a hydraulic coupling in which the amount of fluid in the hydraulic unit is controlled automatically in response to operating conditions. In a preferred construction liquid is caused to flow into the unit automatically in response to the slip or relative rotation between the cooperating members of the unit.

The above and other objects and advantages of the invention will be more readily apparent from the following description when read in connection with the accompanying drawing, in which:

The single figure is a side elevation with parts in axial section of a coupling embodying the invention.

The coupling as shown is adapted to connect a driving shaft 10 to a driven shaft 11. The coupling comprises a hollow casing 12 which is rotatably journaled on the shaft 10 on a bearing 13 and which is drivably connected to the shaft 11 as by being bolted to a flange 14 on the shaft 11. The casing 12 comprises a housing for both a differential gear set and a hydraulic torque transmitting unit which form the operating parts of the coupling and preferably also serves as a liquid reservoir to carry a supply of oil or other operating liquid for the hydraulic unit.

As shown, the differential gear set is of the planetary type including a ring gear 15 formed on the interior of the casing 12 and meshing with planet pinions 16 rotatably carried by a planet carrier 17 which is rigidly connected to the shaft 10. The gear set is completed by a sun gear 18 meshing with the pinions 16 and rigidly secured to an intermediate shaft 19. The shaft 19 is rotatably supported in the planet carrier by a bearing 21 and in the casing 12 by a bearing 22 and is disconnected from both of the shafts 10 and 11.

The hydraulic torque transmitting unit is of the kinetic type and as shown is similar to that more particularly described and claimed in Anderson and Carson Patent No. 2,150,539. This unit comprises a set of radially extending vanes 23 secured to one end of the casing 12 and carrying a core ring 24 intermediate their ends. A set of short vanes 25 is carried by the core ring on the side thereof opposite the vanes 23. A supplemental housing part 26 is secured in the casing 12 spaced from the end thereof and forms with the casing end an annular chamber. Radially extending vanes 27 are carried by the casing part 26 and in turn carry an annular core ring 28 which supports a series of short vanes 29.

The unit is completed by a rotor 31 splined or keyed to the shaft 19 and projecting radially outward between the sets of vanes 23 and 27. The rotor carries inner and outer sets of vanes 32 and 33 on its opposite sides which lie radially within and radially without the short vanes 25 and 29. The vanes on one side of the rotor cooperate with the vanes 23 and 25 to form a toroidal liquid flow chamber while those on the other side cooperate with the vanes 27 and 29 to form a similar flow chamber. While the construction as shown provides a double toroidal hydraulic unit according to Anderson and Carson Patent No. 2,150,539, it will be understood that other types of units could be employed, if desired.

Flow of fluid from the liquid reservoir formed by the chamber 12 into and out of the hydraulic unit occurs during operation through a series of inlet ports 34 formed in the casing part 26 adjacent the periphery thereof and which preferably slope inwardly toward the hydraulic unit. Fluid in the unit may return to the reservoir through outlet ports 35 formed in the casing part 26 adjacent the radial inner portion thereof. The rotor 31 may be formed with openings 36 so that the amount of fluid in the two operating chambers of the unit will be equalized. Preferably the outlet openings 35 are smaller than the inlet openings 34, as shown.

In operation the casing 12 is filled with a sufficient quantity of oil or other desired liquid completely to fill the two operating chambers of the hydraulic unit. When the coupling is stationary this liquid will seek a common level in the hydraulic unit and in the casing so that only a portion of the liquid is within the unit and so that the unit will be only partially filled. As torque is transmitted between the shafts and the unit starts to rotate, the differential gear set will function to cause the rotor 31 either to turn in a direction opposite to that of the casing or to turn in the same direction at a substantially different speed. It will be seen that the relative rotation between the casing and rotor will be greater than that between the two shafts by an amount depending upon the gear ratio in the gear set. With the shaft 10 driving it will turn the rotor 31 forward to cause a circulation outwardly over the vanes 32 and 33 and over the short vanes 25 and 29. This fluid will flow inwardly over the vanes 23 and 27 to transmit torque thereto in a manner well understood in the art. Initially the torque transmitted will be relatively small because of the relatively small amount of fluid in the unit. However, as the fluid flows through the passages defined by the vanes, it will tend to draw additional liquid from the reservoir into the unit through the inlet ports 34. This action occurs because of the aspirating effect of the fluid flowing in the unit and because of the centrifugal head produced on the fluid in the reservoir due to rotation of the reservoir. Liquid in the unit tends to flow back to the reservoir through the ports 35 because, when the unit is only partially filled, the liquid tends to reduce in velocity and increase in pressure as it flows inwardly over the vanes 23 and 27, and because the fluid in the reservoir does not cover the ports 35 during running. With the unit completely filled the liquid may actually increase in velocity as it flows inward over the vanes 23 and 27. However, because of the size relationship between the outlet ports 35 and the inlet ports 34 and because of the centrifugal head created on the fluid in the reservoir and the aspirating effect at ports 34, the quantity of fluid in the unit will increase until the unit is substantially completely filled. At this time the unit will transmit maximum torque and will tend to prevent relative rotation between the sun gear 18 and the ring gear 15 so that the shafts 10 and 11 will tend to turn together with minimum slipping. Because of the gradually increasing torque transmitting characteristics of the hydraulic unit due to its automatically being filled with liquid in response to relative rotation of its casing and rotor member, the coupling can gradually pick up a predetermined load and after a relatively short interval of operation can transmit the load with an efficiency greater than that of the unit alone.

While one embodiment of the invention has been shown and described in detail herein, it will be understood that this is illustrative only and is not to be taken as a definition of the scope of the invention, reference being had for this purpose to the appended claims.

What is claimed is:

1. In a coupling, a hydraulic torque transmitting unit comprising a hollow annular casing, vanes in the casing extending generally radially along at least one side thereof, a rotor in the casing having generally radially extending vanes thereon cooperating with the vanes on the casing to transmit torque therebetween through liquid in the casing, means for driving the rotor to cause outward flow of liquid over its vanes in the casing, means forming an annular liquid reservoir spaced axially from and substantially coextensive radially with the casing, said one side of the casing being formed with a liquid inlet opening adjacent its periphery communicating with the reservoir and lying at an acute angle to the direction of liquid flow therepast such that liquid flow in the casing tends to aspirate liquid from the reservoir into the casing and with a liquid outlet opening radially inward from the inlet opening communicating with the reservoir.

2. In a coupling, a hydraulic torque transmitting unit comprising a hollow annular casing, vanes in the casing extending generally radially along at least one side thereof, a rotor in the casing having generally radially extending vanes thereon cooperating with the vanes on the casing to transmit torque therebetween through liquid in the casing, means for driving the rotor to cause outward flow of liquid over its vanes and inward flow of liquid over the vanes of the casing, means forming an annular liquid reservoir spaced axially from and substantially coextensive radially with the casing, said one side of the casing being formed with a liquid inlet opening adjacent its periphery communicating with the reservoir and lying at an acute angle to the direction of liquid flow therepast such that liquid flow in the casing tends to aspirate liquid from the reservoir into the casing and with a liquid outlet opening smaller than the inlet opening communicating with the reservoir and spaced radially inward from the inlet opening.

REXFORD OLAN ANDERSON.

REFERENCES CITED

The following references are of record in the file of this patent:

UNITED STATES PATENTS

| Number | Name | Date |
|---|---|---|
| 1,640,608 | Klimek | Aug. 30, 1927 |
| 1,822,555 | Weiss | Sept. 8, 1931 |
| 1,881,083 | Kiep | Oct. 4, 1932 |
| 1,963,720 | Sinclair | June 19, 1934 |
| 2,127,738 | Kugel | Aug. 23, 1938 |
| 2,128,828 | Klepper | Aug. 30, 1938 |
| 2,147,528 | Föttinger | Feb. 14, 1939 |
| 2,206,859 | Duffield | July 2, 1940 |
| 2,226,760 | Föttinger | Dec. 31, 1940 |
| 2,271,919 | Jandasek | Feb. 3, 1942 |
| 2,377,851 | Blank | June 12, 1945 |
| 2,407,496 | Jandasek | Sept. 10, 1946 |